Figure 1:
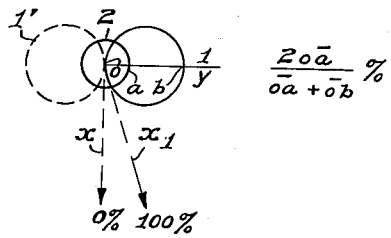

Oct. 7, 1941.     Y. ROCARD     2,257,815
RADIO BEACON
Filed March 30, 1938     2 Sheets-Sheet 1

Inventor
Yves Rocard
By
Attorney

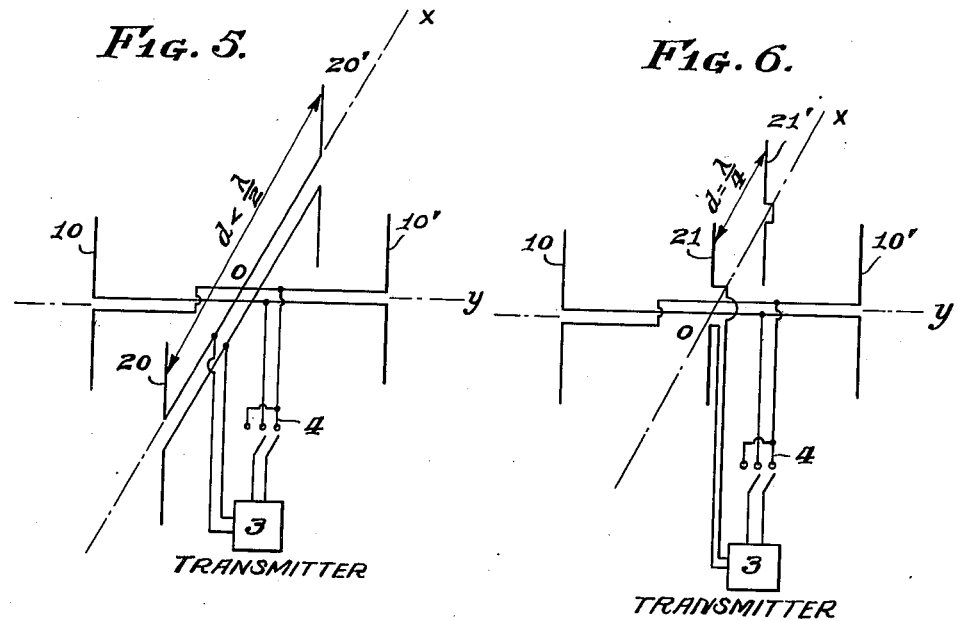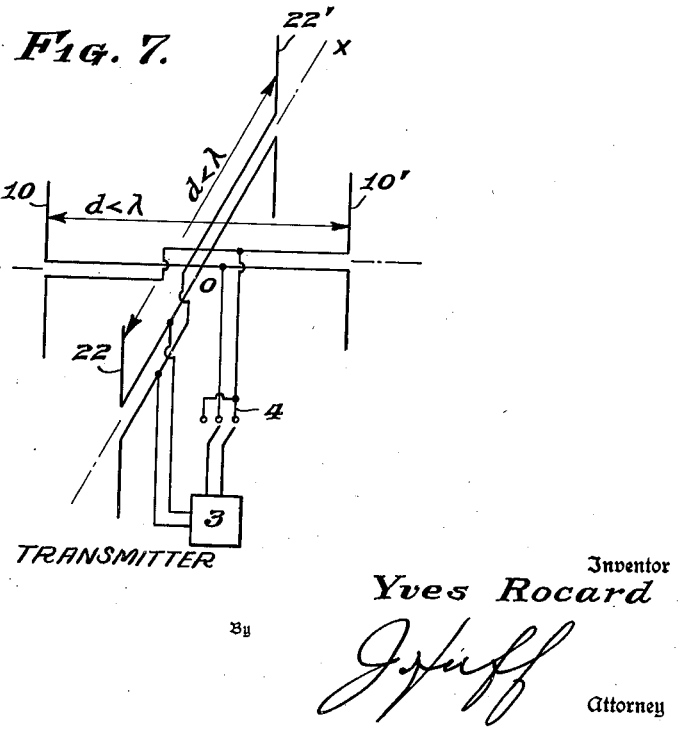

Patented Oct. 7, 1941

2,257,815

UNITED STATES PATENT OFFICE 2,257,815

RADIO BEACON

Yves Rocard, Paris, France, assignor to Compagnie Generale de Telegraphie sans Fil, a corporation of France Application March 30, 1938, Serial No. 198,811
In France April 2, 1937

7 Claims. (Cl. 250—11)

The present invention has as its object the obviation of certain difficulties attendant upon the taking of bearings or in direction-finding by the aid of signals transmitted from radio beacon stations.

Two chief methods are known in the art, namely, the interlocked keying or A—N method in which a sudden change is made in transmitting from one radiation diagram or characteristic to another characteristic as in crossed-coil beacons working with long waves customary in the U. S. A., and the method predicated upon a radio-beacon transmitting a diagram or characteristic of cardioid shape.

In methods of the first kind a rather wide course is outlined (from 4 to 5 degrees, for instance, with a standard receiver), and the ratio of the change in the received signal intensity due to the keying operation to the maximum signal intensity, herein called the keying depth of the signals, increases steadily on departing from the course defined by the radio beacon. The signal corresponding to one radiation diagram increases while that corresponding to the other decreases until only one signal having distinct off and on periods is heard. The keying depth therefore becomes 100 percent when the departure from the course amounts to 45 degrees so that the decrease in clearness of the signals indicates quite distinctly the fact that a course or path is being approached.

In the second method, that is to say, in direction-finding using a cardioid type field distribution, signaling takes place by alternately reversing the phase of the field radiated by one of the two transmitting aerials with respect to the phase of the field radiated by the other. The path defined by the beacon then is characterized by a region of constant signal strength which coincides with the direction in which the antenna which is keyed (loop or frame) emits nothing. The sharpness of the course in this instance may be pushed to a high degree by reducing the intensity of the field that is not so reversed. But when radio beacons of this type are used which outline a very sharp course (say of ½ of 1 degree), the following inconvenience arises: On deviating from the course, the depth of keying of the signals suddenly attains its maximum value, that is, 100 percent, within angles that are still very small (for instance, ±3 degrees of the course), whereas in all other azimuths the keying percentage or depth of the signals decreases rapidly to such an extent that one may get the erroneous impression that a continuous signal is received when listening with a receiver for which the amplitude reproduction is not perfectly linear.

The present invention obviates this inconvenience. It discloses ways and means adapted to define a sharp course, while yet preserving perfect clarity of signals throughout the space. It consists essentially in defining a radio course with the aid of two aerials both of which result in a directional field distribution, one thereof at least having one or more directions of zero signal strength (so to speak an abbreviated loop pattern), while the other one (contradistinct from the systems known in the art when the emission is maximum when the transmission of the former is zero) emits minimum signals (though not quite zero signals) in the said directions or in those where sharp courses are to be outlined.

The transmission of radio-direction finding signals by reversal of the phase of one of the two radiation patterns could be insured by means of any methods known in the art.

Figure 2:
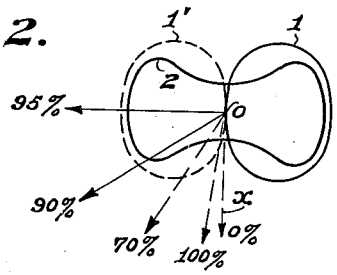
Figure 3:
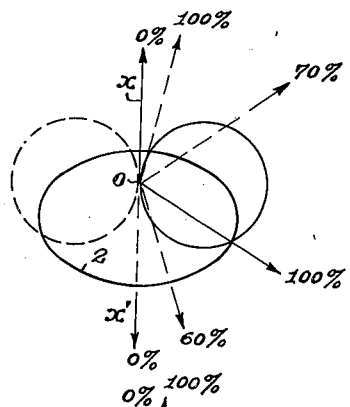
Figure 4:
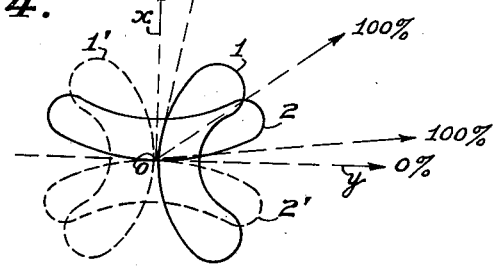

The invention will be more easily understood from the following detailed description by reference to the appended drawings illustrating various exemplified embodiments of the invention, in which Fig. 1 represents a conventional field distribution pattern; Fig. 2 represents a field pattern modified according to this invention; Figures 3 and 4 are alternative embodiments of field patterns; and Figures 5, 6 and 7 illustrate aerial arrangements adapted to produce the radiation patterns of Figs. 2, 3 and 4, respectively.

Figure 1 illustrates the conventional diagram or characteristic of a non-directional antenna and a directional loop combination. The two lobes or curves 1 and 1' are of instantaneously opposite polarity and are the diagram of the frame or loop. The dashed part indicates the phase reversal of the fields in the corresponding region of space, in reference to the part shown by solid line. Reversal causes the dash part to shift to the right, and the solid-line part to shift to the left. Curve 2 is the fixed antenna field distribution pattern. At any point in space in which radiation from both antennas is simultaneously received, the amplitude of the received signal will be equal to the sum of the two radiations when the two are in phase and equal to their difference when they are out of phase. At points where the two radiations are of equal amplitude the resultant received has a maximum depth of keying since the signal varies between zero and twice the amplitude of either one as the phase of the field radiated by one antenna is reversed.

In Fig. 1 the depth of the keying of signals is indicated thus: 0 percent towards $ox$, that is, the course or path covered, since radiation from only one antenna is received 100 percent towards $ox_1$ direction that is still very close to the course because the latter is very sharp and $$\frac{2\overline{oa}}{\overline{oa}+\overline{ob}}$$

towards $oy$, that is to say, 90 degrees of the course. This equation represents the ratio of the change of amplitude, $\overline{ob}\pm\overline{oa}$ or $2\overline{oa}$, to the maximum amplitude $\overline{ob}+\overline{oa}$. This value corresponds to a keying depth around 25%, and this is rather feeble for the ear. Now, it is just this low change in amplitude throughout large angles on either side of the course which it is the purpose of this invention to remedy.

Figure 2 shows an arrangement according to the invention. The curves 1 and 1' still indicate the field distribution produced by the frame antenna, and 2 is the auxiliary antenna characteristic. The keying depth or percentages are also indicated in the figure. It will be noticed that they remain very high throughout the space, say, above 70 percent, and that the path is very sharp.

Figure 3 shows an arrangement in which the path $ox$ is very sharp, while the opposite course $ox'$ is considerably wider; still, the depth of keying remains great almost throughout space, except in the neighborhood of $ox'$.

Figure 4 shows another arrangement covering four equally sharp paths, while resulting throughout space in signals that are keyed at a high modulation percentage. The curves 1 and 1' again stand for the field distribution due to the loop antenna. Curves 2 and 2' represent the auxiliary antenna characteristic; it is similar to the frame 1, 1' characteristic, though turned an angle of 90 degrees, and the part marked 2' has a phase opposed to that of part 2. It can be seen from Fig. 4 that the depth of keying is close to 100 percent throughout space.

In all of the Figs. 2, 3, and 4, as will be noted, the invention has the characteristic feature that any and every course which is to be made sharp and clear corresponds, for the field distribution pattern for one antenna, to a region or section with zero emission, and for the field distribution pattern due to the other antenna to a region of minimum signal strength, whereas for the other directions the field due to the signal emission from each of the two antennas is of the same order of intensity, and this brings the keying percentage up close to 100 percent.

For a still better understanding of the situation, it shall finally be explained how such antenna characteristics may be obtained, presupposing signal transmission with vertical polarization.

Curves 1, 1', of Figs. 1, 2, and 3 are the characteristics of conventional frames or loops.

Curve 2, Fig. 2, is obtained by two doublets disposed in the direction marked $ox$, being spaced apart a distance slightly less than $\lambda/2$ and fed in phase, the middle between the two doublets being at 0.

Curve 2, Fig. 3 also is obtained by a doublet or dipole fed at 0 and anteriorly of which is mounted, at distance equal to $\lambda/4$ along $ox$, another doublet designed to function as a reflector.

The curves 1, 1', Fig. 4 are obtained by two doublets disposed on the axis $oy$ being spaced apart slightly less than $\lambda$ and fed in phase opposition. Curves 2, 2', of Fig. 4, are obtained in the same manner by two doublets similarly disposed on $ox$.

It is to be understood in all instances that the regulation of the phases of the fields represented by curves 2, or 2, 2', with respect to the fields represented by the curves 1, 1' should naturally be effected with a view to insuring maximum efficiency of the signals, this being accomplishable by ways and means well known in the prior art.

The Figures 5, 6 and 7 show aerial systems disposed as explained above for obtaining respectively radiation patterns of Figures 2, 3 and 4.

In all figures identical elements are designated by the same reference letters.

On all the figures, a pair of doublets 10, 10' forms an aerial radiating a field pattern of the shape 1, 1' on Figures 2, 3, 4. These doublets are fed in phase opposition by a transmitter 3 and the feeding phase is inversed by means of a switch 4.

Figure 5, a pair of doublets 20, 20' is disposed on the line $Ox$ at a distance $d$ slightly less than $\lambda/2$. The doublets 20, 20' are fed in parallel by the source 3. The diagram of this system is shown by 2 on the Figure 2.

Figure 6, a single doublet 21 is located at the centre of the system and fed by the source 3. A reflecting doublet 21' is located on the line $Ox$ at a distance $d=\lambda/4$ apart. The diagram of the system 21—21' is shown by 2 on the Figure 3.

Figure 7, a pair of doublets 22, 22' is located on the line $Ox$ perpendicularly to the line $Oy$ joining the doublets 10, 10'. The distance between 22, 22' is slightly less than $\lambda$; they are fed in opposition by the source 3. The distance between 10, 10' is also slightly less than $\lambda$, though it is not necessary that this distance is strictly equal to the distance between 22 and 22'. The resulting diagrams of the system are indicated in 1, 1' and 2, 2' on the Figure 4.

I claim as my invention:

1. A radio beacon system comprising means for producing a first radiation field having two lobes of instantaneously opposite polarity and at least one direction of substantially zero radiation, means for producing a second radiation field the instantaneous polarity of which is the same as that of one of said lobes and the amplitude of which is less in said direction of zero radiation than in all other directions, and means for causing the alternate reversal of the phase of one of said radiation fields to produce an equisignal path in said direction of zero radiation.

2. In a radio-beacon system comprising two aerials for producing radiation fields of predetermined patterns, one of said aerials producing a radiation field having two lobes of instantaneously opposite polarity to produce an axis of zero radiation, means for inversing the phase of the current energizing one of said aerials in a predetermined rhythm to produce a resultant field whose amplitude is alternately equal to the sum and the difference of said radiation fields, the resultant field being constant on said axis of zero radiation, the other of said aerials being adjusted so that the amplitude of the other of said fields is less in the direction of said axis of zero radiation than in any other direction, and its instantaneous polarity the same as that of one of the lobes of said first radiation field.

3. A radio beacon comprising two pairs of dipole aerials disposed in mutually perpendicular planes, the spacing between the first of said pairs being less than a half wave length at the operating frequency, a source of radio frequency currents for energizing one dipole of said first pair in phase with the other dipole of said first pair, means including said source for energizing one dipole of the second of said pairs in phase opposition to the other dipole of said second pair, and means for rhythmically reversing the phase of currents energizing one of said pairs of dipole aerials.

4. A radio beacon comprising two pairs of dipole aerials disposed in mutually perpendicular planes, the spacing between the first of said pairs being less than a half wave length at the operating frequency and the spacing between the second of said pairs being a half wave length at said operating frequency, a source of radio frequency currents for energizing one dipole of said first pair in phase with the other dipole of said first pair, means including said source for energizing one dipole of the second of said pairs in phase opposition to the other dipole of said second pair, and means for rhythmically reversing the phase of currents energizing one of said pairs of dipole aerials.

5. A radio beacon system, comprising a first aerial for producing a first radiation field having two lobes of instantaneously opposite polarity which produce a direction of zero radiation, a second aerial for producing a second radiation field, means for alternately reversing the polarity of one of said radiation fields to produce an equisignal plane in the direction of said zero radiation, and means associated with said second aerial for reducing the relative amplitude of said second radiation field in said direction of zero radiation.

6. A radio beacon comprising means for producing a first directional radiation field having two lobes of instantaneously opposite polarity, a pair of antennas spaced apart less than a half wave length for producing a second radiation field whose instantaneous polarity is the same as that of one of said lobes, and means for alternately reversing the relative polarities of said radiation fields.

7. A radio beacon system comprising two aerials for producing radiation fields of predetermined patterns, one of said aerials producing a field having two lobes of instantaneously opposite polarity which produce a direction of zero radiation, the other of said aerials producing a field whose instantaneous polarity is the same as that of one of said lobes and whose amplitude in said direction of zero radiation is less than in any other direction but greater than zero, and means for alternately reversing the relative polarities of said radiation fields.

YVES ROCARD.